United States Patent [19]
Moncourtois et al.

[11] Patent Number: 5,329,949
[45] Date of Patent: Jul. 19, 1994

[54] HOME WASH SYSTEM WITH RADIO-CONTROLLED INFRARED MOTION SENSOR ACTIVATOR

[76] Inventors: Lane Moncourtois, 101 New Hackensack Rd., Poughkeepsie, N.Y. 12603; Stephen Cook, 11 Taconic Dr., Hopewell Junction, N.Y. 12533

[21] Appl. No.: 852,763

[22] Filed: Mar. 17, 1992

[51] Int. Cl.$^5$ .................................................. B08B 3/02
[52] U.S. Cl. .............................. 134/57 R; 134/123; 134/199; 134/172
[58] Field of Search ............... 134/45, 123, 199, 201, 134/172; 233/208, 533.15; 137/538, 540

[56] References Cited

U.S. PATENT DOCUMENTS

| | | | |
|---|---|---|---|
| 1,322,638 | 11/1919 | Smolensky | 137/540 |
| 2,781,778 | 2/1957 | Lisciani | 137/540 |
| 2,950,061 | 8/1960 | Dickinson | 239/533.15 X |
| 3,024,795 | 3/1962 | Rolla et al. | 134/123 X |
| 3,025,874 | 5/1962 | Yocum | 137/540 |
| 3,027,913 | 4/1962 | Chatham et al. | 137/538 X |
| 3,167,797 | 2/1965 | Hergonson | 134/123 X |
| 3,246,845 | 4/1966 | Techler et al. | 134/561 |
| 3,368,571 | 2/1968 | Honorof | 134/123 X |
| 3,400,725 | 9/1968 | Miller et al. | 134/123 X |
| 3,420,252 | 1/1969 | Struble | 134/123 |
| 3,580,275 | 5/1971 | Hanson | 137/540 X |
| 3,724,472 | 4/1973 | Jenkins et al. | 134/123 X |
| 4,350,176 | 9/1982 | Lace | 137/540 |
| 4,350,179 | 9/1982 | Bunn et al. | 137/540 |
| 4,369,801 | 1/1983 | Jones | 134/123 X |
| 4,530,373 | 7/1985 | Bork, Jr. et al. | 137/540 X |
| 4,711,257 | 12/1987 | Kobayashi | 134/123 |
| 4,813,452 | 3/1989 | Smith | 137/540 |
| 5,018,547 | 5/1991 | Alcorn | 137/538 X |

FOREIGN PATENT DOCUMENTS 226291  7/1943  Switzerland .................... 137/540

*Primary Examiner*—Frankie L. Stinson
*Attorney, Agent, or Firm*—Martin J. Spellman, Jr.

[57] ABSTRACT

A radio remote-controlled automatic vehicle wash system is activated by an infrared motion sensor. A hand-held transmitter activates an optional garage door mechanism of the system to open and activate the wash system. Within a controller is housed a micro-controller programmed to process inputs from the garage door, an RF transmitter, a thermistor and an infrared motion sensor. When predetermined specified conditions are met, the controller activates a solenoid valve to allow pressurized water to flow through distribution pipes at each side of the vehicle, and under it. Nozzles connected to the distribution pipes spray water in a high velocity 45° fan-like pattern to remove dirt, salt and debris from the surface of the vehicle and the undercarriage.

Each nozzle contains a check valve to prevent water from seeping out once the system is depressurized to conserve water and to assure that when the solenoid valve is opened there is no significant delay in opening the nozzles due to absence of water in the distribution pipes. The system is adaptable to any garage or carport as well as with automatic garage door opening.

4 Claims, 6 Drawing Sheets

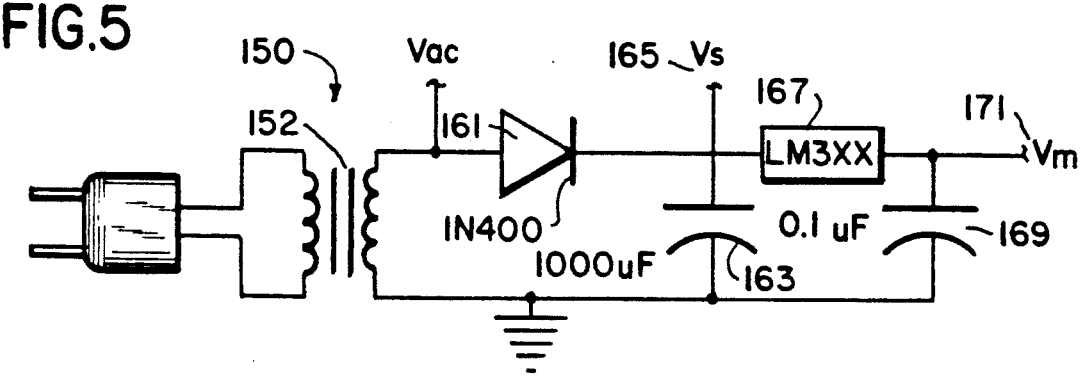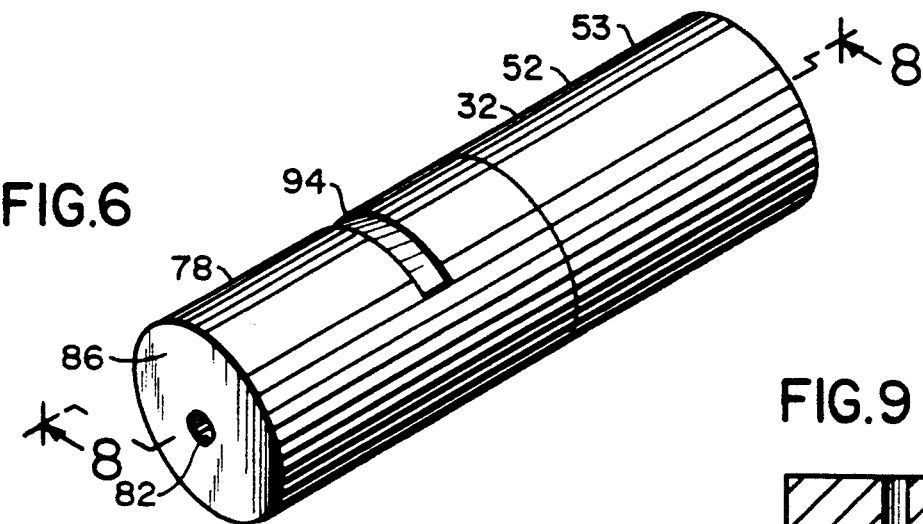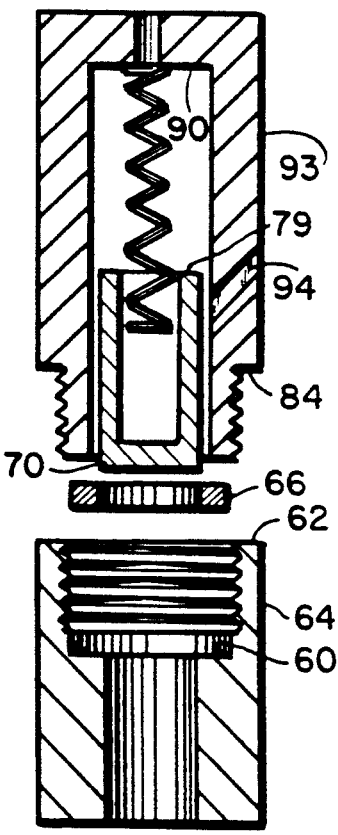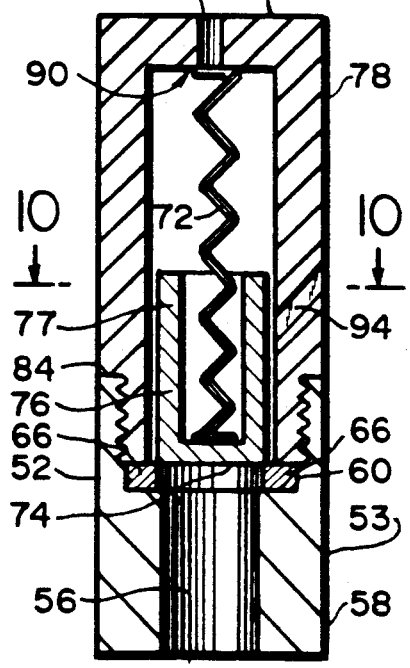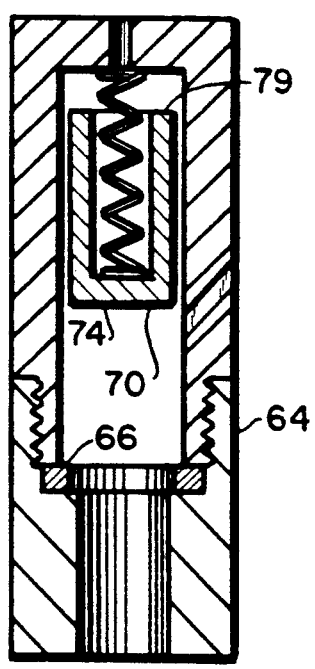

5,329,949

HOME WASH SYSTEM WITH RADIO-CONTROLLED INFRARED MOTION SENSOR ACTIVATOR

BACKGROUND OF THE INVENTION

1. Field of the Invention

This invention relates to an automatic car wash system and particularly to one adapted to be used in conjunction with a residential garage. It is automatically controlled by the user with a common radio transmitter control such as used for activating the residential garage door.

At present, there is no vehicle wash system available for home use which is simple, reliable and can be activated by the user approaching the home garage or carport by simply pressing a button in the vehicle which opens the door automatically, senses the presence and movement of the vehicle, senses temperature, and if above freezing, starts the washing process as the vehicle is entering the garage and automatically ceases when the vehicle has entered the garage, minimizes waste of water, and while spraying the water automatically from within the garage, keeps the water outside of the garage.

2. Prior Art

U.S. Pat. No. 4,369,801 - JONES et al. discloses a simplified structure and control system comprising a framework with nozzles, a washing liquid holding tank, and pressurized tank used to control the amount of water and rate, independently of the local supply pressures.

U.S. Pat. No. 3,578,001 - ATTAWAY discloses a system utilizing a pneumatic control pad on to which the vehicle drives. Related circuits, detergent tank, timer, and switch box are of general interest.

The U.S. Pat. No. 4,464,632 - DUHAME and U.S. Pat. No. 4,808,995 Clark et al., both of which are assigned to Stanley Automatic Openers, illustrate home security and garage door operating systems which perform multiple functions including detecting toxic gases and other environmental conditions.

U.S. Pat. No. 3,724,472 - JENKINS et al,; U.S. Pat. No. 3,368,571 - HONOROF; and U.S. Pat. No. 4,848,383 - BUHLER illustrate typical home control systems tied-in to garage door control systems.

SUMMARY OF THE INVENTION

In accordance with the present invention, a vehicle approaches a garage and the driver activates the system by pressing the "wash" button on a remote switch. The switch also has an "open" button that functions as a regular automatic garage door opener which may bypass the wash system. Such remote control switches are commonly used with remote controlled garage door opening systems and are readily available.

When the "wash" button is pushed, an RF receiver in a controller activates the automatic garage door opener via a signal sent to the terminal on the motor assembly to which the manual switch is connected.

As the door is opening, the controller simultaneously runs a temperature check through a thermistor to determine whether the outside temperature is above freezing.

When the door is completely open, a position switch or motion sensor sends a verifying signal back to the controller.

Once the temperature and door open requirements are met, an infra-red motion sensor is activated. Then, only the "open" button on the remote, or the manual switch will deactivate the system by tripping the door open sensor.

As the vehicle approaches close to the garage door opening, an infrared motion sensor which has an adjustable sensitivity, senses the motion of the vehicle at a predetermined distance from the door opening. The motion sensor is commercially available and is the same type as used with common household security lights.

A signal is sent then from the controller to a solenoid activated valve controlling flow from the pressurized water source. The solenoid valve opens and allows pressurized water to flow through distribution piping to a series of high velocity nozzles which surround the vehicle.

The distribution piping with spray nozzles mounted thereon is supported by wall shrouds, and optionally, ceiling shrouds which are designed to prevent water that is deflected off of the vehicle from getting the interior of garage wet. Floor shrouds protect the lower pipe from being broken by the vehicle also are provided.

Optionally, the distribution pipes can also be installed within the garage wall and beneath the floor while a building is being constructed.

The nozzles are designed to emit a fan-like flow of high-velocity water at a 45 degree angle outwardly of the garage door opening to minimize the amount of water that may get into the garage. Generally, there are six nozzles, two on each side and two serving to wash the undercarriage of the vehicle. More nozzles may be utilized and an overhead pipe with nozzles may be used, however the spray from the side nozzles is generally sufficient to wash the top surfaces of the vehicle.

Each nozzle incorporates a spring biased check valve at the stem thereof to prevent water from leaking out of the nozzle and distribution pipes once the system is depressurized by closing the solenoid valve. This assures that spraying starts as soon as the solenoid valve is opened.

In cold weather climates, a ball valve and check valve preferably are utilized to allow the system to drain in the event the temperature is expected to fall below freezing.

The vehicle continues into the garage until the motion sensor no longer senses it. An adjustable time delay is then activated to allow the system to operate for about three more seconds to assure that the vehicle is past the water spray. Then the signal to the solenoid valve is terminated and the valve shuts off. The garage door will remain open until it is closed either by the remote "open" button or manual buttons.

BRIEF DESCRIPTION OF THE DRAWING

In the accompanying drawing which forms a part of this specification:

FIG. 5 is an electrical schematic of the power source and transformer;

FIG. 6 is a perspective view of a nozzle component;

FIG. 7 is a sectional view of the nozzle component along line 8—8 of FIG. 6 with the valve closed;

FIG. 8 is a similar sectional view showing the nozzle open;

FIG. 9 is a sectional view of the nozzle expanded showing the assemby of component parts of the nozzle; and;

ILLUSTRATIVE SPECIFIC EMBODIMENT

Figure 1:
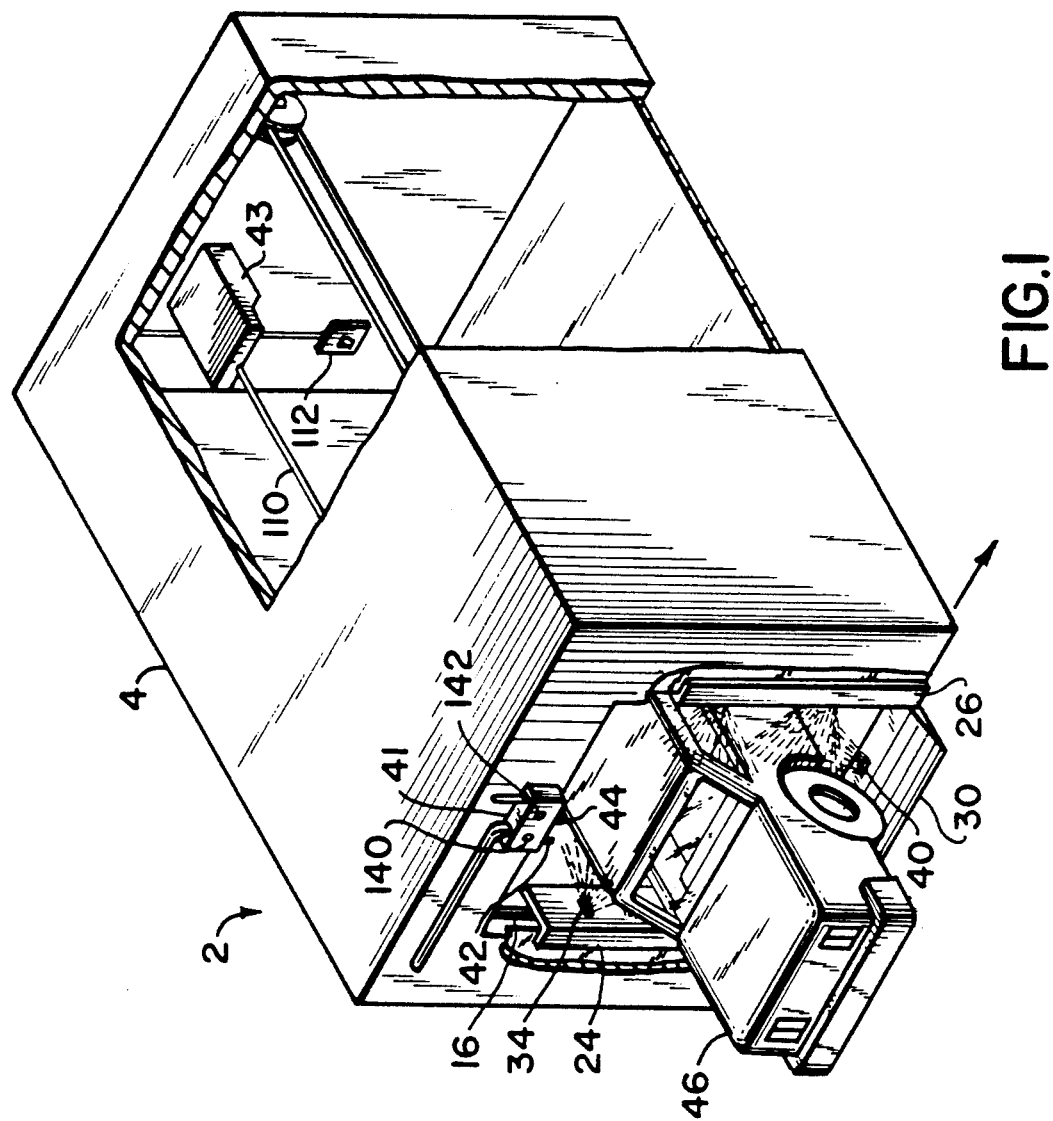
FIG. 1 is a general perspective view of the system installed in a home garage, with a vehicle being washed as it passes through the garage door opening.
Figure 2:
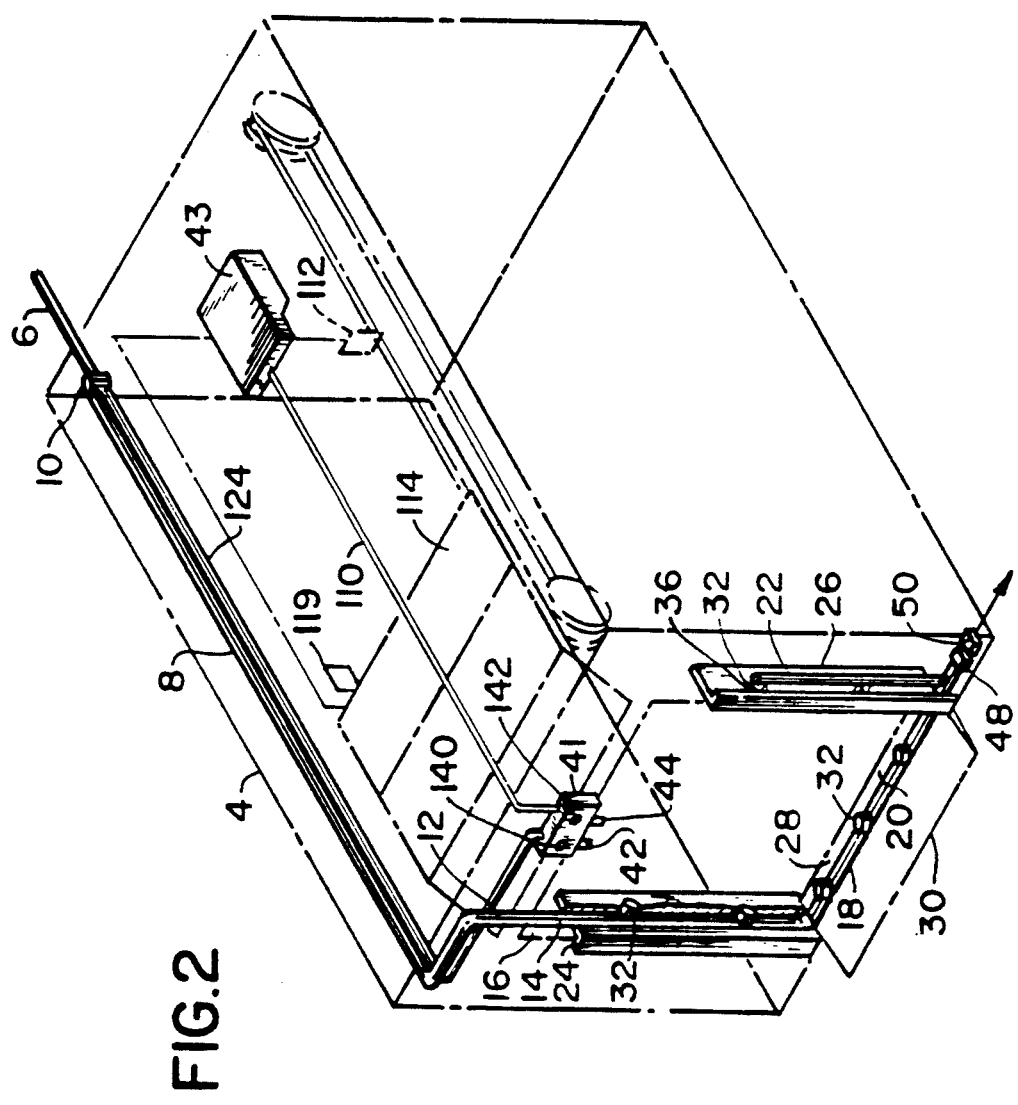
FIG. 2 is a second perspective view of the system with the garage being shown in phantom.

In the accompanying drawing, the wash system 2 present invention is shown in general in FIGS. 1 and 2 installed in a conventional home garage 4.

The home water source line 6 is connected to the system piping 8 by the solenoid operated valve 10. The piping 8 from the valve 10 is preferably PVC includes a distribution section 12 including a line 14 along the left side of the garage door opening 16, a lower line 18 along the bottom 20 of the door opening 16, and a line 22 along the right side of the garage door opening 16.

The lines 14 and 22 at each side of the door opening 16 are located just inside the opening 16 and behind shrouds 24 and 26 respectively. The shrouds 24 and 26 preferably are made of water proof plastic panels which serve to deflect water spray from flowing into the garage 4. The bottom pipe 18 is below the top 28 of a bottom shroud 30 which protects the pipe 18 and nozzles 32 from the tires of the vehicle 46 and also serves to prevent water from flowing on to the garage floor. The bottom shroud 30 is made of solid plastic or hard rubber.

The shrouds 24, 26 and 30 have openings 34, 36 and 40 respectively through which nozzles 32 spray.

A nozzle 32 is shown in detail in FIGS. 6, 7, 8, 9, and 10.

Nozzles 32 are connected to the pipes 14, 18 and 22 by adhesive bonding in aperatures—in the pipes 14, 18, and 22 or optionally the nozzles and pipe may be provided with corresponding threaded means. In all cases, the spray outlet 94 of the nozzle 32 is directed outwardly 45° with respect to the garage door opening 16.

The microcontroller 100 for the system is contained in the weatherproof controller box 41 which also has the IR sensor 42 and temperature sensor 44 extending therefrom externally as indicated in FIG. 2. The IR sensor 42 is adjustable for sensitivity, height, and azimuth as is known in order to detect the vehicle 46 as it approaches the garage 4. The IR sensor 42 is set to detect the vehicle 46 approximately 5-10 feet from the garage 4.

The distribution pipe 12 may be provided with a check-valve 48 and drain valve 50 of known type for draining the system when the temperature is below freezing.

Figure 3:
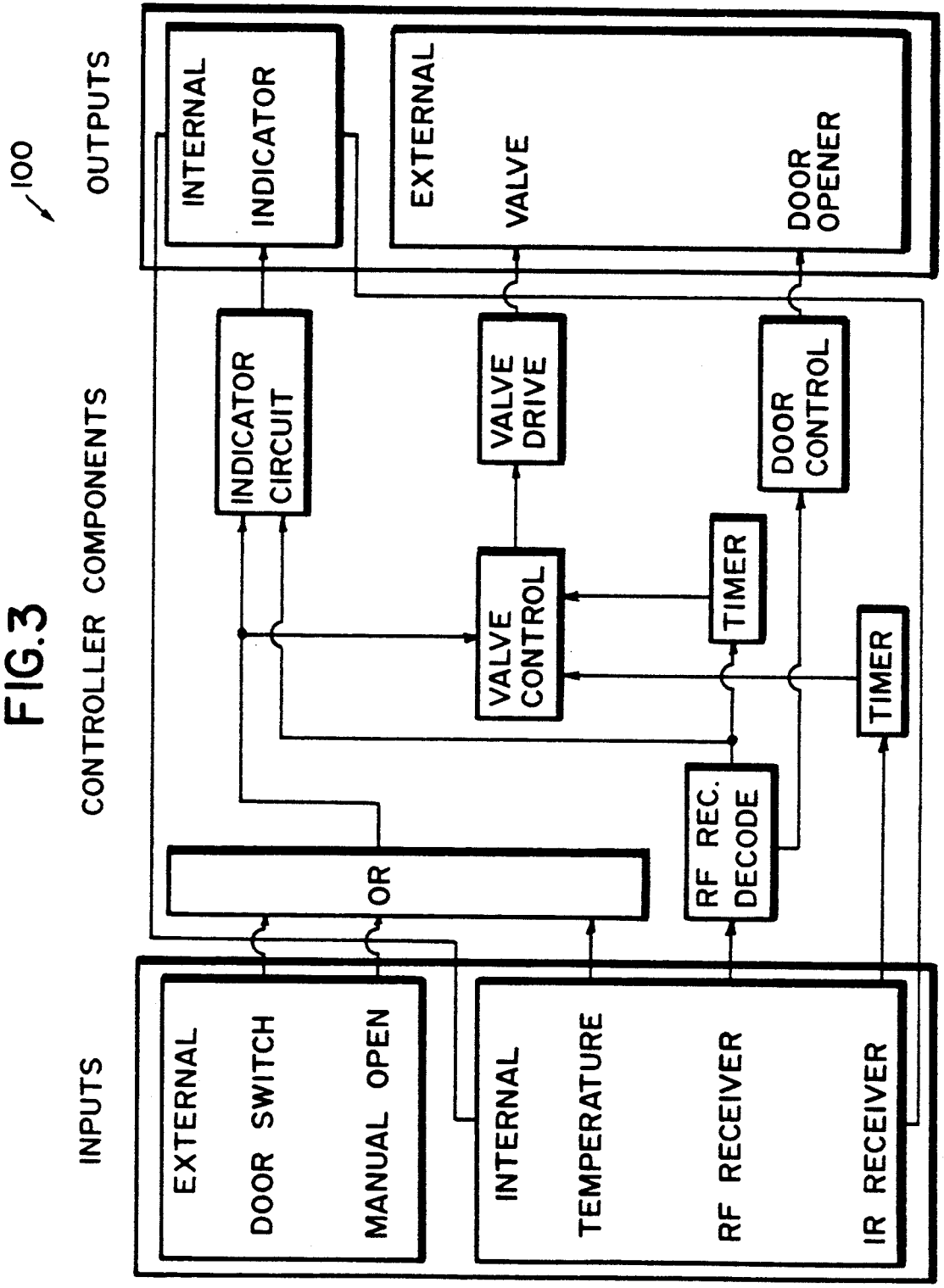
FIG. 3 is a summary schematic of the microcontroller functions.
Figure 4:
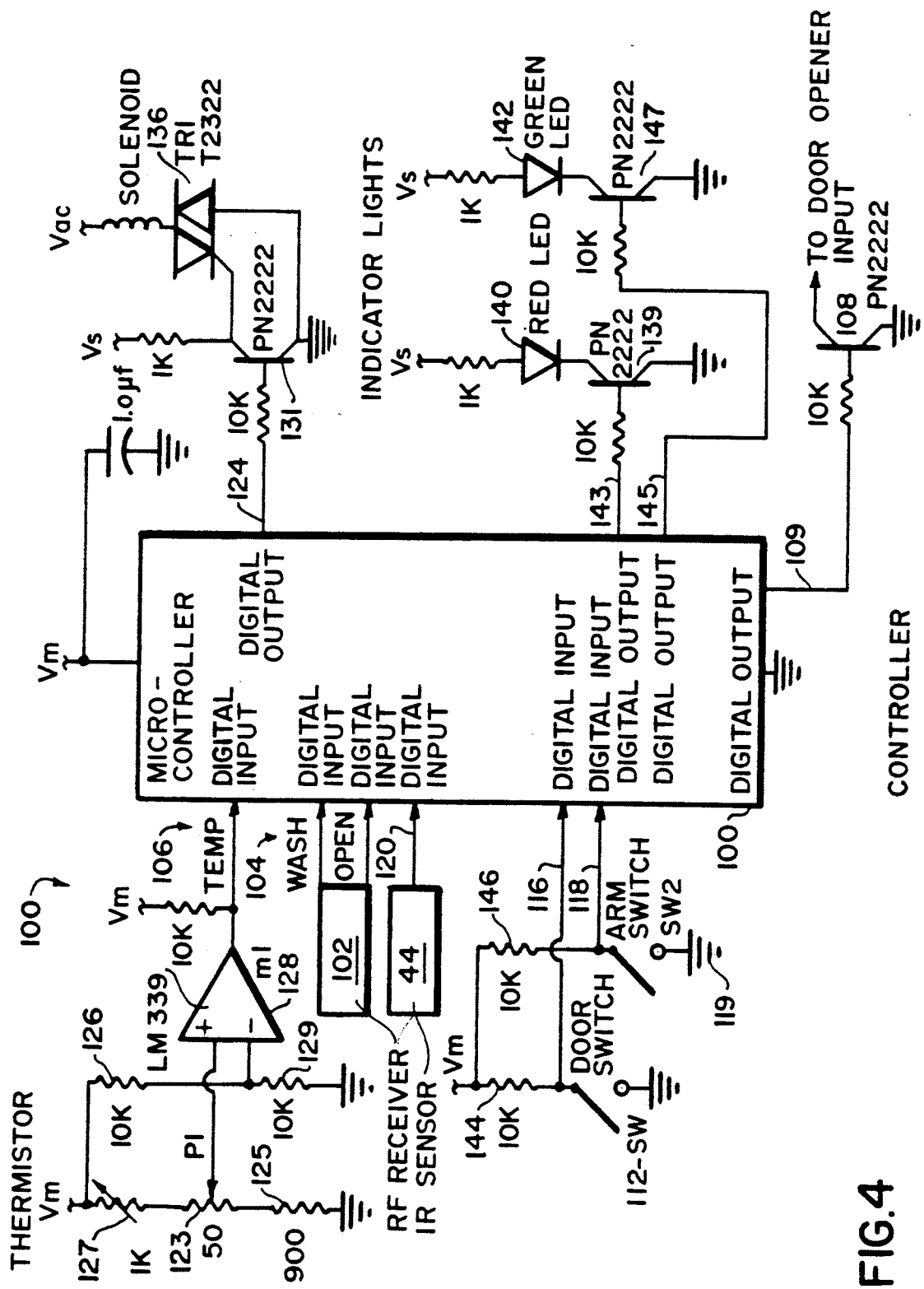
FIG. 4 is an electrical schematic of the system control.
Figure 10:
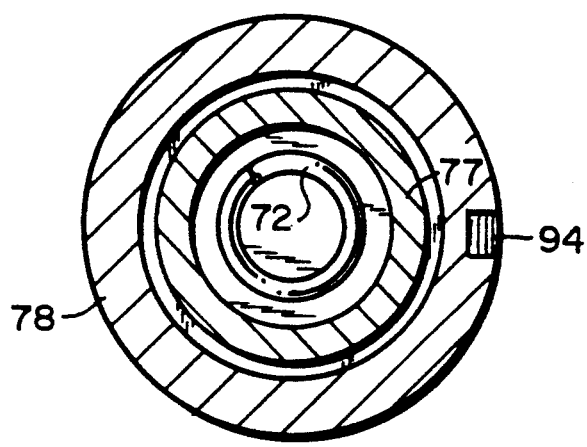
FIG. 10 is a sectional view of the nozzle along lines 10—10 of FIG. 7.

Referring to FIGS. 3 and 4, the microcontroller 100 is the principal component of the control system for the wash system. Microcodes within the microcontroller 100 perform the following functions.

The RF receiver 102, wash signal 104 and temperature signal 106 are continuously monitored in the main polling loop. Should the open door input 116 go high, the microcontroller 100 turns on door opener 108 for 0.5 seconds via output 109. Since output 109 is connected to the garage door opener manual pushbutton switch 112, this will open or close the garage door 114.

When the RF input for the wash signal 104 goes high, the microcontroller 100 then assures that the garage door 114 is open, via input 118 from micro-switch 119, and that the temperature is above freezing via temperature input 106 from sensor 44. If these conditions are not met, the microcode will return to the main polling loop, waiting for a new RF command.

If the door 114 is open and the temperature is above freezing, the microcontroller 100 will then monitor the input 120 from the infrared sensor 42. When the infrared sensor input 120 indicates the vehicle 46 has entered the field of sensor 42, the microcode will then turn on the solenoid valve 10 via output 124 and allow water to flow through the solenoid operated valve 10 to the distribution pipe 12.

The microcode will keep the valve 10 open as long as there is motion indicated by the infrared sensor 42 via input 120.

When motion is no longer detected, the microcode will keep the solenoid valve 10 open for an additional 3 seconds, which may adjusted, to allow the vehicle 46 to completely enter the garage 4.

If the wash signal 104 from the RF receiver 102 goes high while the water is flowing through the solenoid valve 10 the microcontroller 100 will immediately turn off the valve 10 and return to the main polling loop.

Resistors 123 and 125 and thermistor 127 comprise the temperature sensing section. The thermistor 127 changes in resistance proportionately to temperature, causing the output of the resistive network to be proportional to temperature. Resistors 126 and 129 form a reference comparison voltage against which the temperature is compared by comparitor 128. P1 is used to fine tune the temperature circuit so that comparitor 128 trips at the desired temperature. The input 106 is a digital signal that indicates if the temperature is above or below freezing.

In order to activate the solenoid valve 10, 131 is turned off via the microcontroller 100 outputting a low signal to the base at output 124. This causes the triac 136 to be triggered which allows the 24 V AC to flow to the solenoid valve 10. When the microcontroller 100 is outputting a high signal on 124, 131 is on, the triac gate is grounded and the solenoid 10 is therefore off.

Circuits 139 and 147 act as current amplifiers, boosting signals of microcontroller 100 to sufficient current levels to illuminate the red LED 140 or the green LED 142. Should the microcontroller 100 output a high state to output 143 or 145, the respective LED will illuminate, red 140 to indicate no go, or green 142 that the system is go.

Resistors 144 and 146 and switch 119, (SW 2) provide digital outputs indicating if the door 114 is open or if the system has been deactivated. Switch debouncing is accomplished in the microcontroller 100.

The power source 150 consists of a single secondary transformer 152. The secondary winding itself generates Vac the alternating current voltage for the solenoid valve 10.

Diode 161 and capacitor 163 perform half wave rectification and filtering for the unregulated DC voltage 165 (Vs) used for noncritical circuitry. The 3-pin regulator 167 along with capacitor 169 forms the regulated DC voltage 171 (Vm) used for critical circuits.

Referring to FIGS. 6-10, the nozzle 32 utilized in the washer system is shown in greater detail.

The base 52 comprises a cylindrical body 53 having an annular central passage 56. The external walls 58 are smooth when the pipe 12 and body 53 are made with PVC in which case the nozzle 32 may be glued into an opening in the pipe 12 in the well-known manner.

As shown, the body 53 of the base 52 of the nozzle 32 has an annular recess 60 with a shoulder 62. The recess 60 is defined by the walls 64 and is provided with an O-ring 66. A cylindrical plunger 76 having one end 70 closed towards the inlet 56 of the valve base 52, in the valve closed position, is pressed against the O-ring 66 to seal the valve closed to prevent flow of water. The face 74 of the plunger 76 is pressed against the O-ring by spring 72 which is designed to start compressing at a pressure of 15 lbs. per square inch of water against the face 74 of the plunger 76. The valve shell 78 comprises a cylindrical body 93 closed at its outer end 86 except for a drain aperture 82 to allow escape of blow-by water. The outer shell 78 has an annular undercut 84 to mate with the walls 64 of the base portion 52 of the nozzle 32. As shown in the drawing, the parts generally are comprised of PVC and assembled with adhesive, and or threads.

The compression spring 72 rests against the end wall 90 of the shell 78 and, with the system off, serves to urge the plunger 76 against the O-ring 66 to seal the inlet 56 closed to prevent drainage of standing water from the distribution pipes 12. Aside from preventing the flow of drainage water and consequent waste, this feature assures that the distribution pipe 12 is full when the solenoid valve 10 is moved to the open position, so that all the nozzles 32 will be substantially instantaneously pressurized and open to commence supplying water together as the water pressure simultaneously causes the plungers 76 to move against the compression springs 72 moving the plungers 76 to rest against the faces 90 of end walls 86 of the shells 78.

At full pressure, the end 79 of the side walls 77 of the plunger 76 serves as a stop to prevent overcompression of the spring 72 by pressing against the face 90 of end wall 86.

The outer shell 78 has an opening 94 therein extending over an arcuate portion and oriented 45° to the longitudinal axis of the valve body 52. The opening 94 in the side walls 93 of the shell 78 is spaced from the end wall 86 a distance greater than the length of the plunger 76 so that when the plunger 76 is moved against the face 90 of wall 86 by the water pressure, the outlet 94 is open to the flow of water from inlet 56.

As indicated above, the nozzles 32 are secured to the distribution pipes 14, 18 and 22 in such manner that the water is directed 45° away from the garage 4 entrance.

While the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. A vehicle washing apparatus adaptable for use with an automatically openable garage door, said apparatus comprising a washing liquid source, said liquid source in controllable flow communication with distribution pipes mounted vertically on each side of the garage door opening and along the base of said opening, spray nozzles mounted on said pipes and in flow communication therewith, said nozzles being oriented to direct a fluid spray towards a vehicle passing said pipes and outwardly from said door opening, and shroud means associated with said pipes to prevent sprayed fluid from entering said garage and protecting said pipes and nozzles from said vehicle and wherein an electronic controller operable by a user controls the operation of said apparatus including means to initiate said operation by a signal to said controller to activate a motor to open said garage door, IR sensing means to sense the approach of said vehicle to said door opening, temperature sensing means to determine if the ambient temperature is above the freezing point of said washing fluid, means to determine the condition that said door is open and that the temperature is above the washing fluid freezing point, said IR motion sensor being activated upon determination that said door is open and said temperature above freezing, said sensing means then activating the flow control means to allow pressure flow of washing liquid from said source to said nozzles, said flow terminating when said IR sensor no longer senses said vehicle motion, and the controller after a predetermined time deactivates said flow control means to terminate flow from said source.

2. Apparatus as claimed in claim 1 wherein said nozzles have automatic means closing them off from said supply pipes when there is no pressure of washing fluids, 3. Apparatus as claimed in claim 2 provided with a drain and check valve to drain the system when unpressurized.

4. A vehicle washing apparatus adaptable for use with an automatically openable garage door, said apparatus comprising a washing liquid source, said liquid source in controllable flow communication with distribution pipes mounted vertically on each side of the garage door opening and along the base of said opening, spray nozzles mounted on said pipes and in flow communication therewith, said nozzles being oriented to direct a fluid spray towards a vehicle passing said pipes and outwardly from said door opening, and shroud means associated with said pipes to prevent sprayed fluid from entering said garage and protecting said pipes and nozzles from said vehicle and wherein an electronic controller operable by a user controls the operation of said apparatus including means to initiate said operation by a signal to said controller to activate a motor to open said garage door, IR sensing means to sense the approach of said vehicle to said door opening, means to determine the condition that said door is open, said IR motion sensor being activated upon determination that said door is open, said sensing means then activating the flow control means to allow pressure flow of washing liquid from said source to said nozzles, said flow terminating when said IR sensor no longer senses said vehicle motion, and the controller after a predetermined time deactivates said flow control means to terminate flow from said source.

* * * * *